(12) United States Patent
Ruoff et al.

(10) Patent No.: US 6,367,979 B1
(45) Date of Patent: Apr. 9, 2002

(54) ANGULAR CONTACT BALL BEARING INSTALLABLE IN A CLOSED HOUSING

(75) Inventors: Gottfried Ruoff, Oberwerrn; Heinrich Hofmann, Schweinfurt, both of (DE)

(73) Assignee: FAG Automobiltechnik AG (DE)

( * ) Notice: Subject to any disclaimer, the term of this patent is extended or adjusted under 35 U.S.C. 154(b) by 0 days.

(21) Appl. No.: 09/567,566

(22) Filed: May 5, 2000

(30) Foreign Application Priority Data

May 5, 1999 (DE) .......................................... 199 20 629

(51) Int. Cl.[7] ............................ F16C 19/50; F16C 33/58
(52) U.S. Cl. ........................ 384/517; 384/516; 384/537
(58) Field of Search .................................. 384/490, 510, 384/513, 515, 516, 517, 537, 559, 560, 563, 564, 569, 584, 585

(56) References Cited

U.S. PATENT DOCUMENTS

| | | | | |
|---|---|---|---|---|
| 886,950 A | * | 5/1908 | Cornforth | ................... 384/510 |
| 2,033,771 A | * | 3/1936 | Leister et al. | ................ 384/515 |
| 4,765,762 A | * | 8/1988 | Rozentals | ............... 384/510 X |
| 4,788,758 A | * | 12/1988 | Gordon et al. | .......... 384/537 X |
| 5,722,167 A | * | 3/1998 | Duchamp et al. | .... 29/898.07 X |

* cited by examiner

Primary Examiner—Thomas R. Hannon
(74) Attorney, Agent, or Firm—Ostrolenk, Faber, Gerb & Soffen, LLP

(57) ABSTRACT

In order to allow a ball bearing to be inserted into a housing which is closed at one end, without any bearing parts being damaged during the axial insertion process, the outer ring of the bearing has a radially inwardly directed flange that extends radially into the region of the inner ring while toward the open end of the housing, the inner ring is formed on the axially outward side of the bearing balls, without a shoulder on the inner ring. An axial compression spring is arranged between the closed end of the housing and the inner ring. The flange on the outer ring may be either axially inward of or axially outward of the row of bearing balls.

14 Claims, 4 Drawing Sheets

ANGULAR CONTACT BALL BEARING INSTALLABLE IN A CLOSED HOUSING

BACKGROUND OF THE INVENTION

The invention relates to a ball bearing in a closed housing and to particular features which enable installation of the bearing in the housing.

In order to produce a rigid ball bearing, the inner and outer rings of the respective bearing are normally pressed into the surrounding parts with an interference fit. If the pressing-in force can be exerted on each of the rings, there should be no problems. However, in some installation situations, for example, electric motors, in which accessibility is limited, for example, because of a closed housing, installation of the bearing can be performed only from the open end of the housing. In principle, there are two options for this installation. Either the roller bearing is first pressed into the housing and the shaft is then pressed into the inner ring hole, or the roller bearing is first pressed onto the shaft outside the housing, and this unit is then pressed into the housing. In both installation processes, the pressing-in forces must be transmitted via the bearing balls. But this must be avoided in order to avoid damaging the roller bearing during the installation.

SUMMARY OF THE INVENTION

The object of the invention is to provide a roller bearing in which the bearing interior, and particularly the balls is not stressed when the roller bearing is pressed into the housing or onto the shaft.

This object is achieved by the invention. In order to allow a ball bearing to be inserted into a housing which is closed at one end, without any bearing parts being damaged during the axial insertion process, the outer ring of the bearing has a radially inwardly directed flange that extends radially into the region of the inner ring while toward the open end of the housing, the inner ring is formed on the axially outward side of the bearing balls, without a shoulder on the ring. An axial compression spring is arranged between the closed end of the housing and the inner ring. The flange on the outer ring may be either axially inward of or axially outward of the row of bearing balls.

Since the outer ring has a radial flange which extends into the region of the inner ring, the inner ring comes into contact with this flange while being pressed into a housing that is closed at one end, and the inner ring drives the outer ring even if the latter is arranged in the housing with an interference fit. In order that the pressing-in forces do not go beyond the bearing interior and that the balls and raceways not be damaged, the inner ring has no shoulder on its side facing the housing opening. This allows the outer ring and the inner ring to move relative to one another as required, without having to overcome any force.

In order that the positions of the rings and races may be reset after the pressing-in process, an axial direction compression spring is provided between the flange of the outer ring and the inner ring. This moves the races with respect to one another until the balls once again come into contact with the raceways.

Other objects and features of the invention are explained with reference to the drawing Figures.

DESCRIPTION OF THE PREFERRED EMBODIMENTS

Figure 1:
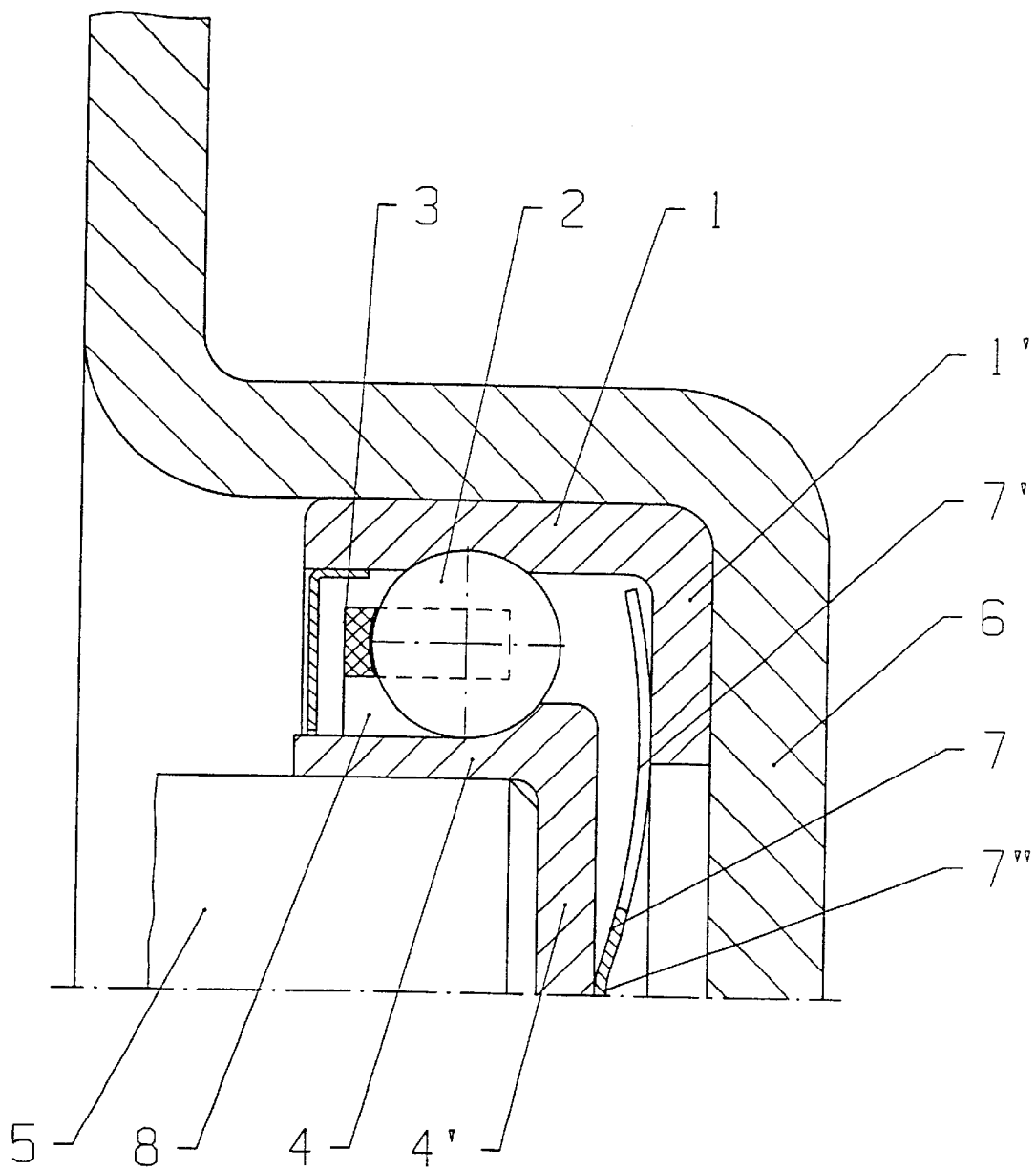
FIG. 1 shows a longitudinal section of a fragment of a ball bearing according to the invention, during installation.

A ball bearing according to the invention according to FIG. 1 comprises an outer ring 1 with an integrally formed, radially inwardly projecting flange 1' on its inwardly installed, lateral side. It further comprises bearing balls 2 with a roller bearing cage 3, and a bearing inner ring 4 with the integrally formed radially inwardly projecting, closed base 4'. The installation sequence for such a bearing is irrelevant, because either the ball bearing can first be pressed into the closed housing 6 via its outer ring 4 and the shaft 5 can then be pressed into the inner ring 4, or vice versa. No load is placed on the balls 2 of the ball bearing in either installation procedure.

An axial direction compression spring 7, in the form of a slightly curved disk 7' with a central projection 7", is disposed between the flange 1' and the base 4' to urge them to not contact.

Figure 2:
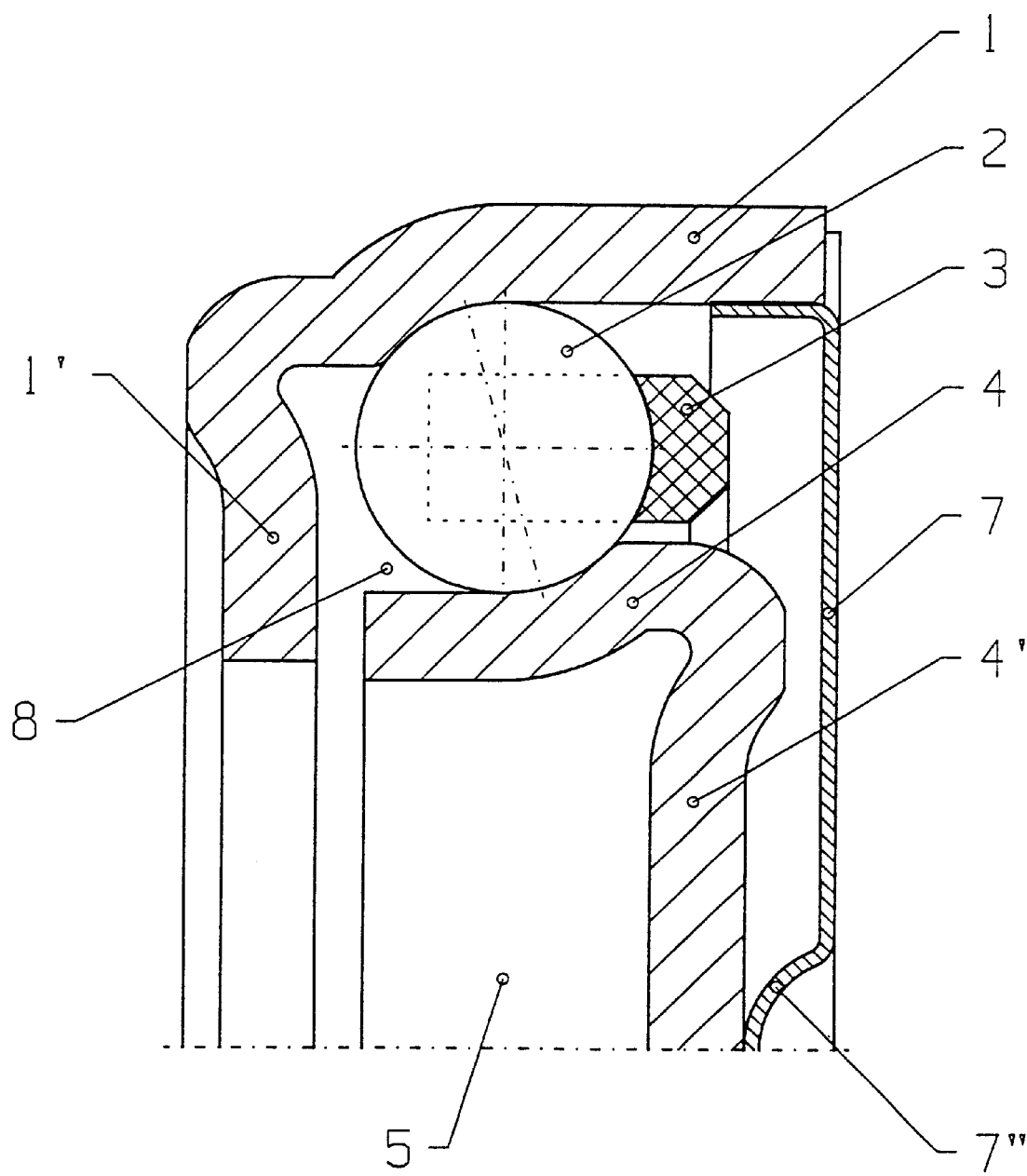
FIG. 2 shows a longitudinal section of a fragment of a variant of the ball bearing according to the invention.

FIG. 2 shows a variant of the bearing of the invention, which permits only one installation sequence. That sequence comprises the steps of pressing the ball bearing via the outer ring 1 into the closed housing 6, and then pressing the shaft 5 into the inner ring 4. When the shaft is being pressed in, the radial flange 4' of the inner ring 4 is supported on the closed housing and the ball 2 rolls, since there is no shoulder 8 on the inner ring 4 on this side, without any load out of the raceway on to the outer surface of the inner ring 4. After it has been pressed in, the inner ring 4 is pushed back over the flange 4' and the axial spring 7 until the ball 2 is seated in the raceway. The axial compression spring 7 is centered in the outer ring 1, and its projection 7" presses centrally against the radial flange 4' of the inner ring 4.

Figure 3:
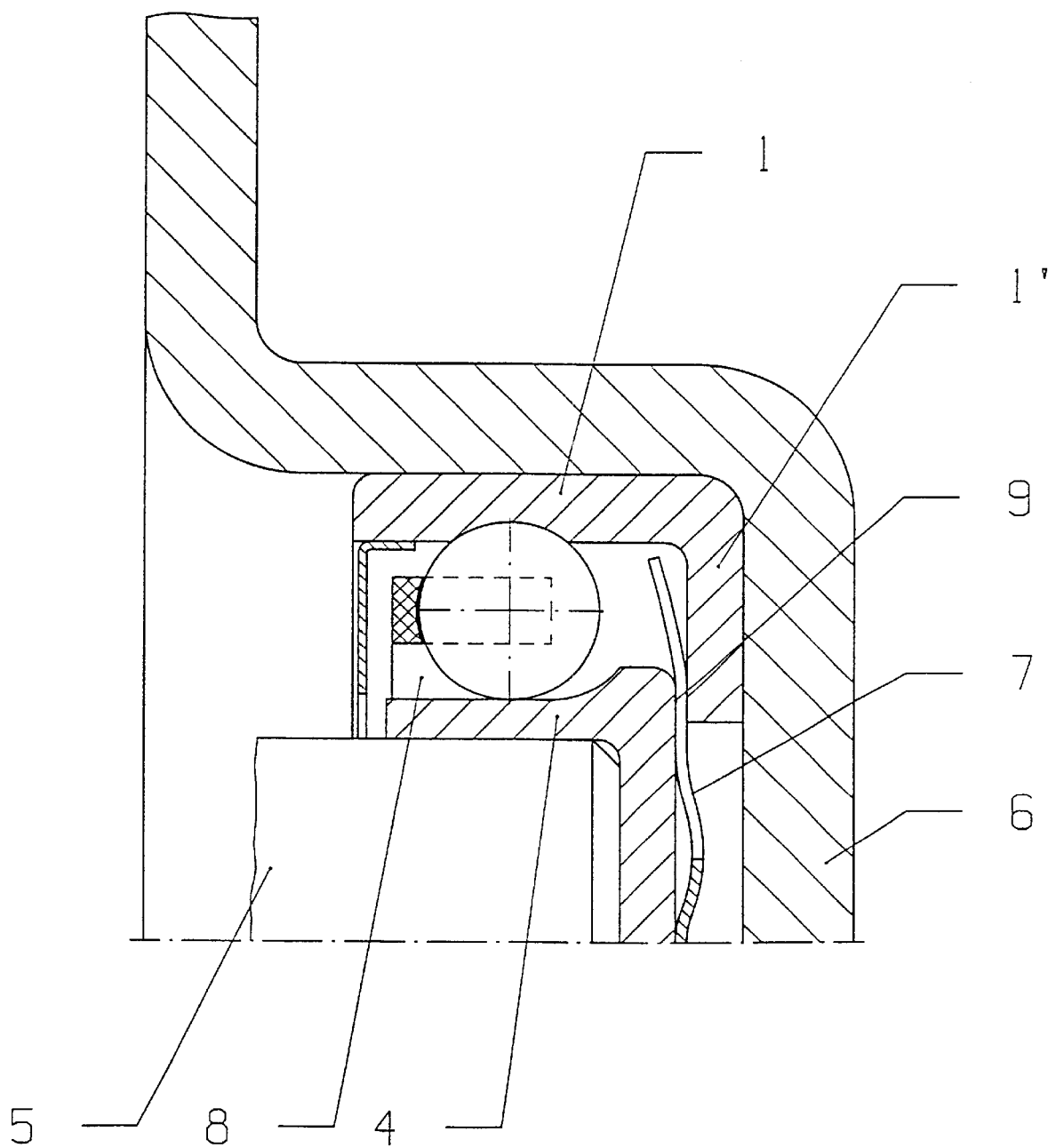
FIG. 3 shows the ball bearing of FIG. 1 after installation.

FIG. 3 shows the process of installing a bearing of FIG. 1, into a housing with a push fit. The installation force can only be applied through the shaft 5, since the housing 6 is closed. If this were a ball bearing with shoulders on both lateral sides of the balls, that is on the inner ring as well, the installation force required to overcome the sliding force between the outer ring 1 and the housing 6 would be carried via the shoulders of the ball bearing. This would lead to damage to or destruction of the ball bearing. To avoid this, the inner ring 4 is formed on one lateral side 8 of the row of balls without a shoulder. Thus, as shown in FIG. 3, the inner ring 4 can move axially without any force with respect to the outer ring 1 until the inner end face of the inner ring 4 comes into contact with the flange 1' of the outer ring 1, and particularly into contact with the deformed axial spring 7 between them. The installation force is then transmitted via the contact point 9 described above on the inner ring. Once the outer ring 1 has reached its final position in the housing 6 due to pressing on the inner ring, there are again no forces on the shaft 5 or the inner ring 4. The axial compression spring 7 then presses these two parts back to their correct position again, as shown in FIG. 1. Radial and axial forces can then once again be transmitted by the bearing, in the same way as in a normal angular contact ball bearing.

Figure 4:
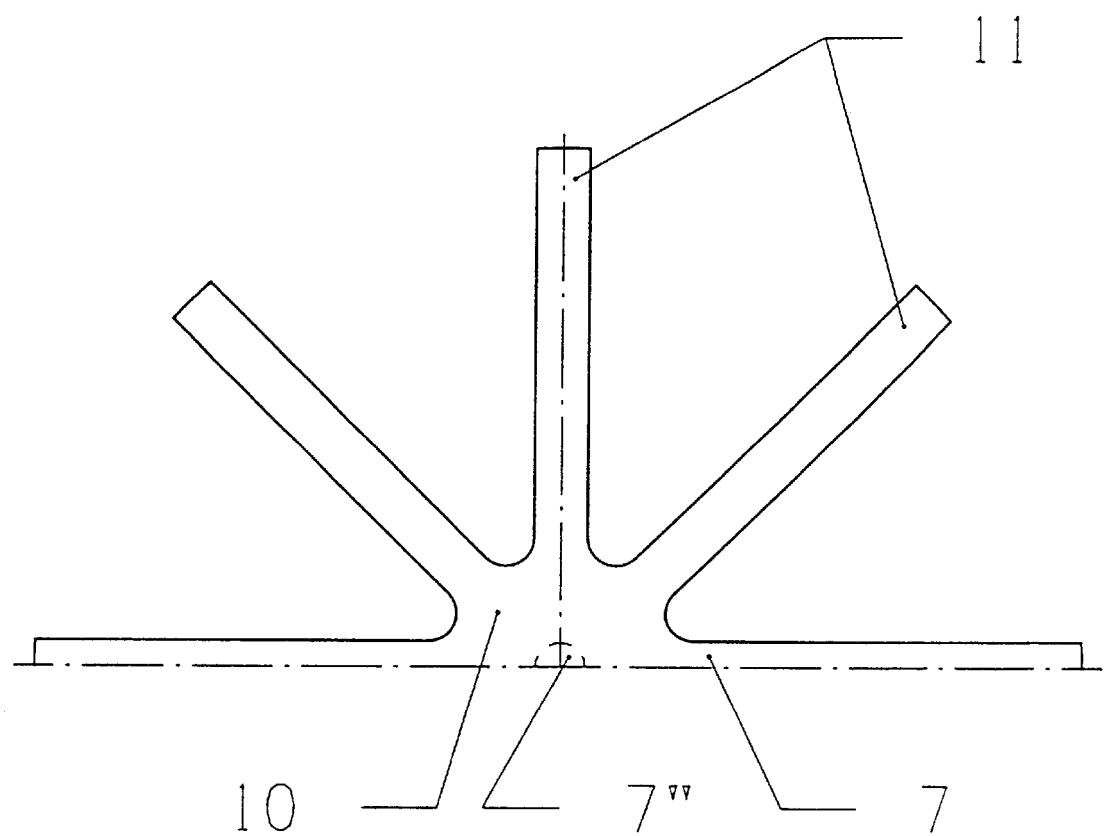
FIG. 4 shows an axial plan view of an axial compression spring used in the bearing.

As shown in FIG. 4, the axial compression spring 7 is shaped generally as a star. It comprises a central section 10 with a central, axial projection region 7", and with fingers 11 which are distributed uniformly around the circumference. The projection 7" provides centrally disposed support on the base 4' of the inner ring 4, and the long fingers 11 center the axial compression spring 7 in the outer ring 1. Although this is not shown, the shape of the axial compression spring 7 may be simplified if, the projection is provided on the base 4' of the inner ring 4 rather than on the spring 7. This alternative is not illustrated.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A ball bearing for being installed in a housing which is closed at one end and is open at the opposite end of the housing;

the bearing comprising an outer ring, an inner ring inward of the outer ring and bearing balls between the outer and the inner rings;

the outer ring having a radially inwardly directed flange extending radially into the region of the inner ring;

the inner ring being formed without a shoulder at a lateral side of the inner ring and of the bearing balls at the inner ring that is toward the open end of the housing; and an axial compression spring arranged at the closed end of the housing, between the housing and the inner ring for biasing the inner ring away from the closed end of the housing.

2. The ball bearing of claim 1, wherein the axial compression spring comprises a slightly curved disk having a radially central projection projecting axially toward the inner ring.

3. The ball bearing of claim 2, wherein the disk has fingers projecting radially outward and being distributed uniformly in the radially outer region outward of the central projection.

4. The ball bearing of claim 1, wherein the flange of the outer ring is on the lateral side of the outer ring and of the bearing balls that is axially outward toward the open end of the housing.

5. The ball bearing of claim 1, wherein the inner ring has a shoulder thereon on the lateral side thereof axially inward in the housing and axially inward of the bearing balls.

6. The ball bearing of claim 1, wherein the flange of the outer ring is on the lateral side of the outer ring and of the bearing balls that is axially inward toward the closed end of the housing.

7. The ball bearing of claim 6, wherein the inner ring has a radially inwardly extending projection at the lateral side thereof that is into the housing; and the compression spring biases between the flange of the outer ring and the inwardly extending projection of the inner ring;

wherein the flange of the outer ring is on the lateral side of the outer ring and of the bearing balls that is axially into the housing.

8. The bearing of claim 6, wherein the inner ring has a radially inwardly extending projection at the lateral side thereof that is into the housing; and the spring biasing between the flange of the outer ring and the inwardly extending projection of the inner ring.

9. The ball bearing of claim 6, wherein the spring biases between the flange of the outer ring and the inner ring, wherein the flange of the outer ring is toward the closed end of the housing.

10. In combination, a housing having a closed end and an open end, and the bearing of claim 1, wherein the bearing is disposed in the housing with the spring between the closed end of the housing and the inner ring.

11. A ball bearing for being installed in a housing which is closed at one end and is open at the opposite end of the housing;

the bearing comprising an outer ring, an inner ring inward of the outer ring and bearing balls between the outer and the inner rings;

the inner ring being formed without a shoulder at a lateral side of the inner ring and of the bearing balls at the inner ring that is toward the open end of the housing; and an axial compression spring arranged at the closed end of the housing, between the housing and the inner ring for biasing the inner ring away from the closed end of the housing.

12. The ball bearing of claim 11, wherein the spring extends between the outer ring and inner ring for preventing movement of the inner ring into the closed end of the housing as far as the outer ring is into the closed end of the housing.

13. The ball bearing of claim 12, further comprising the outer ring including a radially inwardly directed flange and the spring engaging the outer ring by engaging the radially inwardly directed flange thereof.

14. The ball bearing of claim 12, wherein the outer ring has an inwardly directed flange on a lateral side of the outer ring and of the bearing balls that is axially outward toward the open end of the housing, and the spring is between the outer ring and the inner ring.

* * * * *